(12) United States Patent
Lee et al.

(10) Patent No.: US 10,885,787 B2
(45) Date of Patent: Jan. 5, 2021

(54) METHOD AND APPARATUS FOR RECOGNIZING OBJECT

(71) Applicant: Samsung Electronics Co., Ltd., Suwon-si (KR)

(72) Inventors: Jaewoo Lee, Hwaseong-si (KR); Cheolhun Jang, Pohang-si (KR); DongWook Lee, Hwaseong-si (KR); Wonju Lee, Suwon-si (KR); Dae Hyun Ji, Hwaseong-si (KR); Yoonsuk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/014,078

(22) Filed: Jun. 21, 2018

(65) Prior Publication Data

US 2019/0080608 A1    Mar. 14, 2019

(30) Foreign Application Priority Data

Sep. 14, 2017 (KR) .................. 10-2017-0117658

(51) Int. Cl.
| | |
|---|---|
| *G08G 1/16* | (2006.01) |
| *G06K 9/32* | (2006.01) |
| *B60W 30/095* | (2012.01) |
| *G06N 3/02* | (2006.01) |
| *G01S 19/42* | (2010.01) |
| *G06K 9/00* | (2006.01) |
| *G06N 3/04* | (2006.01) |

(52) U.S. Cl.
CPC ......... *G08G 1/165* (2013.01); *B60W 30/0953* (2013.01); *G01S 19/42* (2013.01); *G06K 9/00805* (2013.01); *G06K 9/3241* (2013.01); *G06N 3/02* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 8,260,036 B2 | 9/2012 | Hamza et al. | |
| 2010/0079590 A1* | 4/2010 | Kuehnle | G06K 9/00798 348/118 |
| 2014/0086451 A1* | 3/2014 | Liu | G06K 9/00798 382/103 |
| 2015/0154461 A1* | 6/2015 | Kitaura | G06K 9/00845 348/148 |

(Continued)

FOREIGN PATENT DOCUMENTS

| | | |
|---|---|---|
| JP | 10-1641491 B1 | 7/2016 |
| JP | 5968064 B2 | 8/2016 |

(Continued)

*Primary Examiner* — Redhwan K Mawari
*Assistant Examiner* — Melanie J Patrick
(74) *Attorney, Agent, or Firm* — Sughrue Mion, PLLC

(57) ABSTRACT

An object recognition method and apparatus are provided. The object recognition apparatus acquires localization information of a vehicle, acquires object information about an object located in front of the vehicle, determines a candidate region in which the object is predicted to exist in an image in front of the vehicle, based on the localization information and the object information, and recognizes the object in the image based on the candidate region.

23 Claims, 7 Drawing Sheets

(56) References Cited

U.S. PATENT DOCUMENTS

| | | |
|---|---|---|
| 2015/0168155 A1 | 6/2015 | You |
| 2017/0038477 A1 | 2/2017 | Schmid |
| 2017/0091564 A1* | 3/2017 | Kawasaki .......... G06K 9/00798 |
| 2017/0161569 A1* | 6/2017 | Ren .................... G06K 9/00798 |
| 2017/0270378 A1* | 9/2017 | Guan ................. G06K 9/00825 |
| 2018/0254607 A1* | 9/2018 | Kitano .................... G01S 17/93 |
| 2018/0322371 A1* | 11/2018 | Dupont De Dinechin .................. G06K 9/3216 |

FOREIGN PATENT DOCUMENTS

| | | | |
|---|---|---|---|
| JP | 2017-68617 A | | 4/2017 |
| JP | 2017-84137 A | | 5/2017 |
| JP | 2017-102861 A | | 6/2017 |
| KR | 20120057458 A | * | 6/2012 |
| KR | 10-2014-0027479 A | | 3/2014 |

\* cited by examiner

METHOD AND APPARATUS FOR RECOGNIZING OBJECT

CROSS-REFERENCE TO RELATED APPLICATIONS

This application claims the benefit under 35 USC § 119(a) of Korean Patent Application No. 10-2017-0117658, filed on Sep. 14, 2017, in the Korean Intellectual Property Office, the entire disclosure of which is incorporated herein by reference for all purposes.

BACKGROUND

1. Field

The following description relates to a method and apparatus for recognizing an object.

2. Description of Related Art

Recently, due to development of the automobile industry, various high technologies are being applied to automobiles to enhance a convenience of a driver and a safety of a vehicle. In particular, high technologies for recognizing objects from a front view image of a vehicle captured using a camera mounted in the vehicle are rapidly increasing. To utilize the above high technologies in a vehicle traveling at a relatively high speed in various environments such as the night, snow or rain, a high object recognition rate is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object recognition method including acquiring localization information of a vehicle, acquiring object information about an object located in front of the vehicle, determining a candidate region in which the object is predicted to exist in an image acquired in front of the vehicle, based on the localization information and the object information, and recognizing the object in the image based on the candidate region.

The determining of the candidate region may include determining a size of the candidate region based on an error caused by any one or any combination of the localization information and a parameter of a camera used to acquire the image.

The determining of the candidate region may include determining that the size of the candidate region increases, in response to an increase in the error.

The determining of the candidate region may include determining a vertical size of the candidate region based on an error in a traveling direction of the vehicle included in the localization information.

The determining of the candidate region may include determining a horizontal size of the candidate region based on an error in a lateral placement of the vehicle that is perpendicular to a traveling direction of the vehicle and that is included in the localization information.

The determining of the candidate region may include determining the candidate region to be located at a point at which the object is expected to be located in the image, in response to the object being projected to an image domain based on the localization information and the object information.

The recognizing of the object may include recognizing the object in the candidate region based on an adaptive detection threshold that is less than a default detection threshold, in response to the object not being recognized in the image based on the default detection threshold.

The recognizing of the object may include recognizing the object in regions other than the candidate region in the image based on a default detection threshold, and recognizing the object in the candidate region based on an adaptive detection threshold that is less than the default detection threshold.

The recognizing of the object may include cropping the image to obtain the candidate region and recognizing the object in the cropped candidate region.

The recognizing of the object may include generating candidate boxes having a central point located in the candidate region in the image, and recognizing the object using a region-based convolutional neural network (R-CNN) to which the generated candidate boxes are applied, wherein a number of the generated candidate boxes are greater than or equal to a threshold.

The recognizing of the object may include increasing an image quality of the candidate region to be greater than a quality of the image by performing image processing on the candidate region, and recognizing the object in the image including the candidate region with the increased image quality.

The acquiring of the object information may include determining an object that is predicted to be located in front of the vehicle, based on the localization information, and acquiring information about a location and a type of the determined object.

The object may include any one or any combination of a traffic light, a traffic sign and a signboard that are fixed at a location in a road on which the vehicle travels.

The recognizing of the object may include recognizing the object in response to a classification probability of the object being greater than a detection threshold.

The localization information may include any one or any combination of a current location of the vehicle, a latitude of the vehicle, a longitude of the vehicle, and a heading angle of the vehicle.

In another general aspect, there is provided an object recognition apparatus including a processor configured to acquire localization information of a vehicle, acquire object information about an object located in front of the vehicle, determine a candidate region in which the object is predicted to exist in an image acquired in front of the vehicle, based on the localization information and the object information, and recognize the object in the image based on the candidate region.

The processor may be configured to determine a size of the candidate region based on an error caused by any one or any combination of the localization information and a parameter of a camera used to acquire the image.

The processor may be configured to determine a vertical size of the candidate region based on an error in a traveling direction of the vehicle included in the localization information.

The processor may be configured to determine a horizontal size of the candidate region based on an error in a lateral placement of the vehicle that is perpendicular to a traveling direction of the vehicle and that is included in the localization information.

The processor may be configured to recognize the object in the candidate region based on an adaptive detection threshold that is less than a default detection threshold, in response to the object not being recognized in the image based on the default detection threshold.

The processor may be configured to recognize the object in regions other than the candidate region in the image based on a default detection threshold, and to recognize the object in the candidate region based on an adaptive detection threshold that is less than the default detection threshold.

In another general aspect, there is provided an object recognition apparatus including a sensor configured to capture an image in front of a vehicle, a head-up display (HUD), a memory configured to store landmark map information, and a processor configured to acquire localization information of a vehicle, determine, from landmark map information, object information about an object located in front of the vehicle, determine a candidate region for the object in the image, based on the localization information and the object information, and recognize the object in the image based on the candidate region, in response to a classification probability of the object being greater than a threshold, and output the object through the HUD.

Other features and aspects will be apparent from the following detailed description, the drawings, and the claims.

Figure 1:
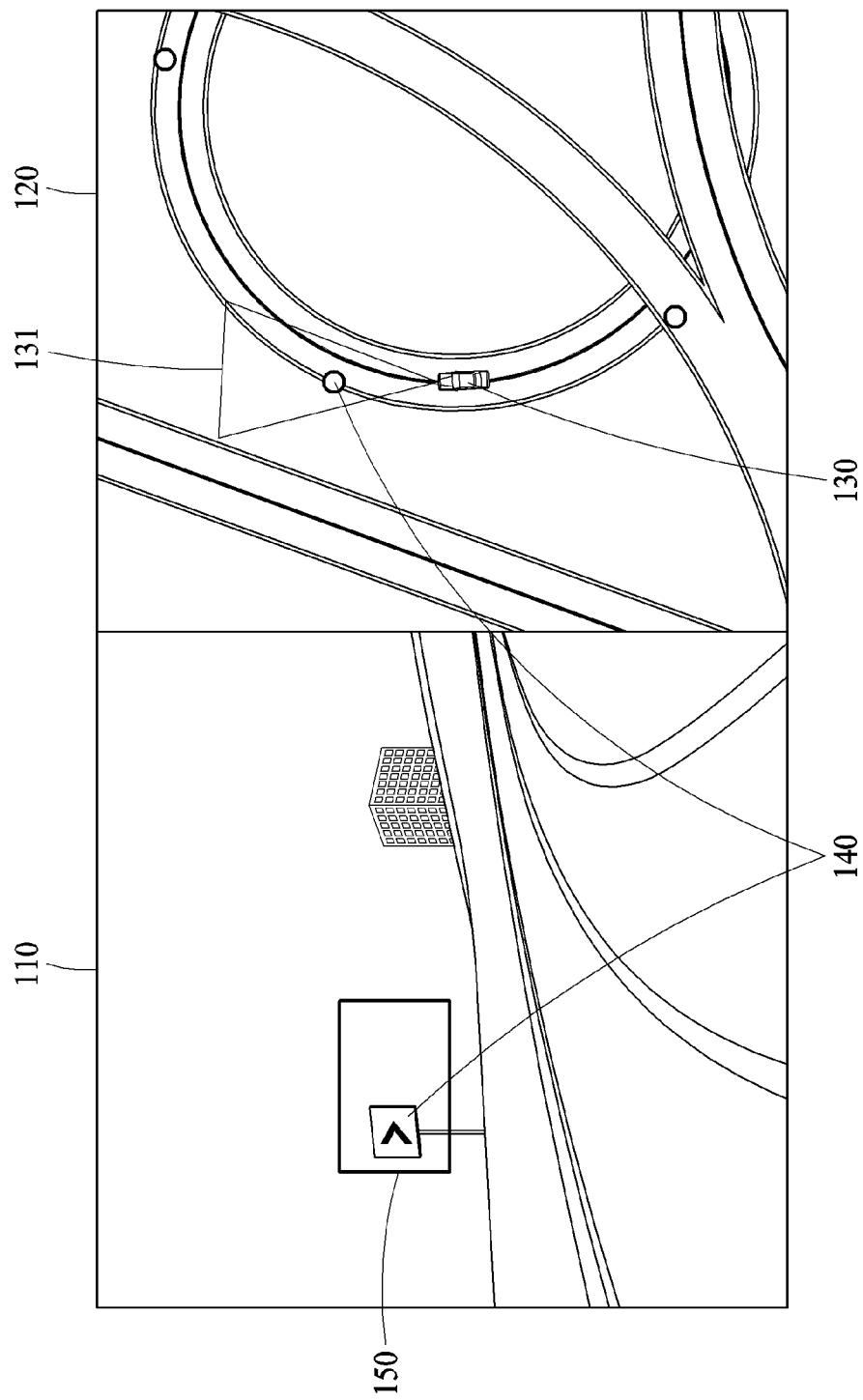
FIG. 1 is a diagram illustrating an example of a process of recognizing an object in an image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise.

In the following description, examples may be used to recognize an object in an image captured in a vehicle. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone. In an example, the apparatus for recognizing an object is applicable to a robot requiring a positioning operation. The embodiments may also be used to interpret the visual information in a device including an intelligent system such as a head-up display (HUD) installed for driving assistance in a vehicle or a fully autonomous driving system to assist safe and comfortable driving.

FIG. 1 illustrates an example of a process of recognizing an object in an image.

FIG. 1 illustrates an image 110 acquired by a camera of a vehicle 130, and a map 120 on which localization information is displayed.

In an example, the camera is mounted in the vehicle 130. For example, the camera is fixed at a position in the vehicle 130, such as, for example, a windshield, a dashboard, or a rear-view mirror. The camera captures a front side of the vehicle 130.

The image 110 is acquired by capturing the front side of the vehicle 130 and includes an object 140. The object 140 includes, for example, any one or any combination of a signboard, a traffic sign, or a traffic light fixed in a location in a road on which the vehicle 130 travels. In an example, the object 140 is a landmark to transfer information needed for the travel of the vehicle 130.

An object recognition apparatus recognizes the object 140 in the image 110 based on a candidate region 150. An object recognition indicates detecting and recognizing various objects, for example, a traffic light, a traffic sign or a signboard, that need to be recognized during traveling of the vehicle 130, and hereinafter is referred to as an "object detection" for convenience of description.

The candidate region 150 is a region in which the object 140 is predicted to exist in the image 110, and is determined based on localization information of the vehicle 130 and object information about the object 140.

The localization information of the vehicle 130 is information indicating a current location of the vehicle 130, and includes, for example, a latitude, a longitude and a heading angle of the vehicle 130. The localization information of the vehicle 130 will be further described below with reference to FIG. 2.

The object information includes information about a type and a location of the object 140. The object 140 is an object that is predicted to be located in front of the vehicle 130 based on the localization information of the vehicle 130. For example, a current location of the vehicle 130 is determined based on the latitude and the longitude in the localization information, and a field of view (FOV) 131 is determined based on the current location of the vehicle 130 and the heading angle in the localization information. The object 140 in the FOV 131 is determined to be located in front of the vehicle 130, and the object information is acquired.

In an example, the object information is acquired from a landmark map. The landmark map stores information about various objects (for example, a traffic light, a traffic sign or a signboard) that are fixed on a road. Positions of the various objects remain largely unchanged over time. When the current location of the vehicle 130 is determined based on the localization information of the vehicle 130, as described above, a distribution of objects located in a vicinity of the vehicle 130 and relative locations of the vehicle 130 and each of the objects are determined, and accordingly the object information about the object 140 that is determined to be located in front of the vehicle 130 is acquired from the information stored in the landmark map.

The type of the object 140 indicates whether the object 140 corresponds to one of a traffic light, a traffic sign and a signboard. Also, the location of the object 140 includes a latitude and a longitude of the object 140, and a height of the object 140 from the ground.

The object recognition apparatus robustly recognizes the object 140 based on the candidate region 150 in which the object 140 is predicted to exist in the image 110, even in various adverse environments, such as, for example, night, rain, snow, or backlight. A recognition result obtained by the object recognition apparatus is applied to traveling of a vehicle by recognizing a traffic signal and/or traffic regulations in an autonomous driving system, an advanced driver-assist system (ADAS) or a localization system, or is used to acquire exact localization information of the vehicle 130.

Figure 2:
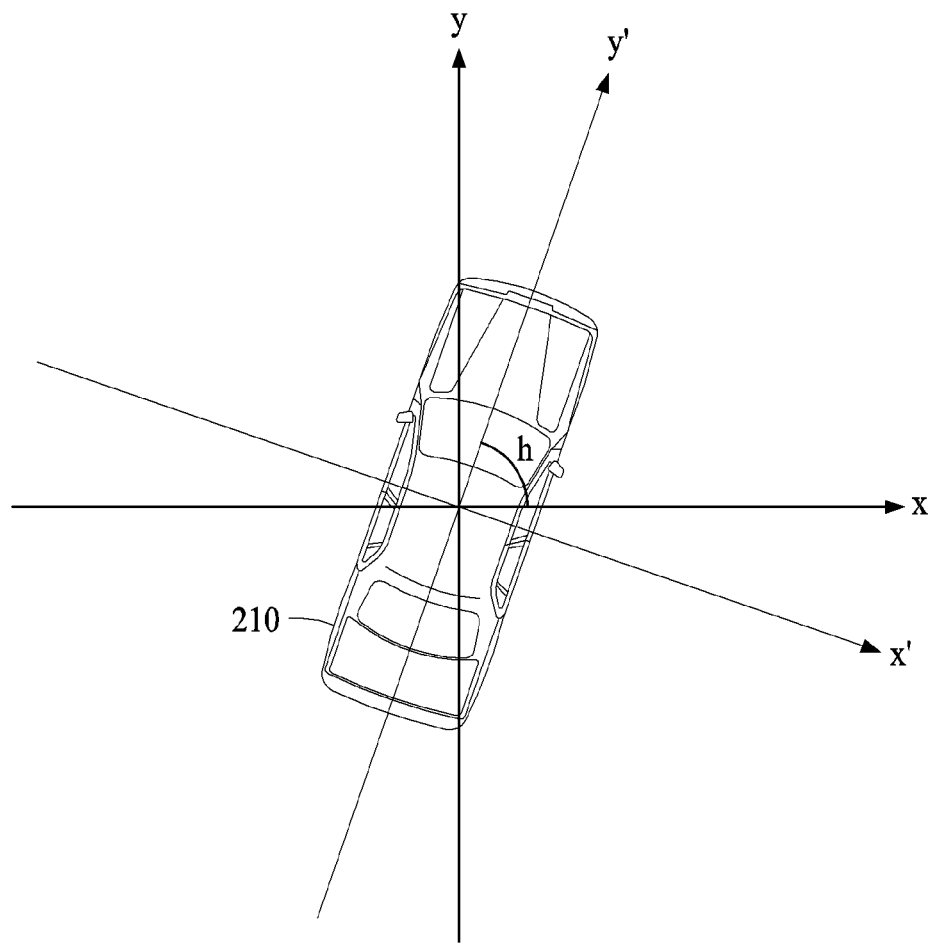
FIG. 2 is a diagram illustrating an example of localization information of a vehicle.

FIG. 2 illustrates an example of localization information of a vehicle.

In FIG. 2, x and y coordinates and x' and y coordinates represent localization information of a vehicle 210.

The localization information of the vehicle 210 is expressed by a latitude, a longitude and a heading angle h in the x and y coordinates. An x-axis represents the longitude and a y-axis represents the latitude. Also, the heading angle h represents a traveling direction of the vehicle 210 as an angle based on the x-axis, and is referred to as a "yaw angle." The localization information of the vehicle 210 is acquired by various localization systems, such as, for example, a high-precision global positioning system (GPS) or a landmark localization system that re mounted in the vehicle 210.

The localization information represented by the x and y coordinates is converted to localization information represented by the x' and y coordinates based on the traveling direction of the vehicle 210 using the heading angle h. In the x' and y' coordinates, a y-axis represents the traveling direction of the vehicle 210 and an x'-axis represents a lateral direction perpendicular to the traveling direction of the vehicle 210. The localization information represented by the x' and y coordinates is used to determine a size of the candidate region 150 of FIG. 1, which will be further described below with reference to FIG. 3.

Figure 3:
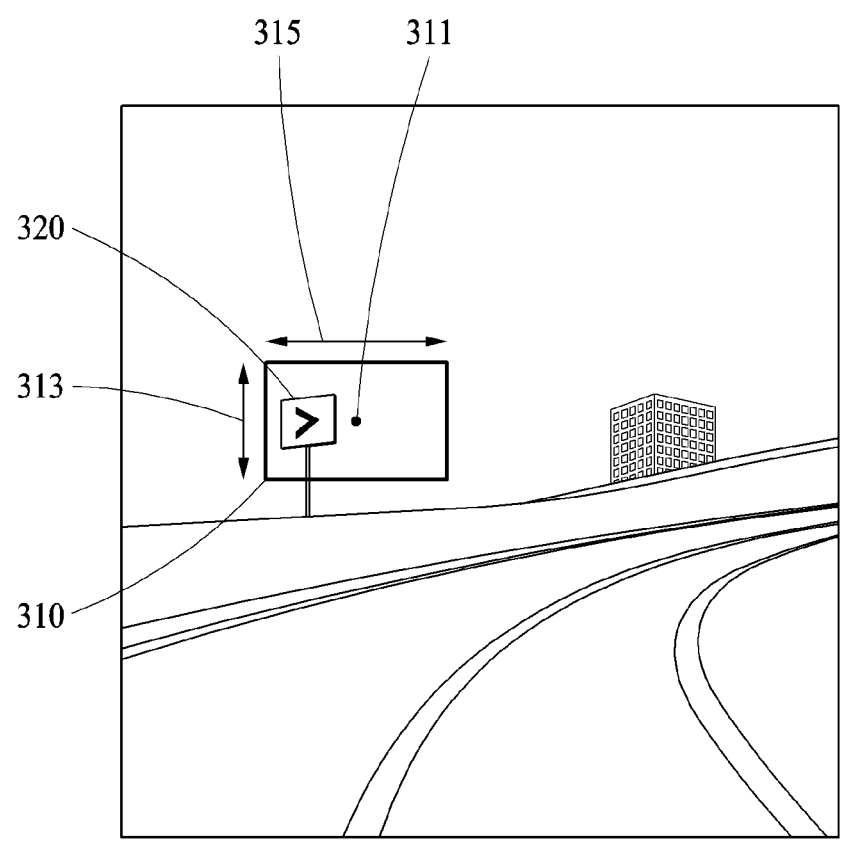
FIG. 3 is a diagram illustrating an example of a location and a size of a candidate region.

FIG. 3 illustrates an example of a location and a size of a candidate region.

FIG. 3 illustrates an example of a process of controlling a location and a size of a candidate region 310 in an image. For convenience of description, the candidate region 310 has a rectangular shape as shown in FIG. 3, however, there is no limitation thereto. Accordingly, candidate regions 310 with various shapes are applicable.

The candidate region 310 is a region in which an object 320 is predicted to exist in an image, and has a size and a location. The location of the candidate region 310 is determined as a point at which the object 320 is expected to be located in the image when the object 320 is projected to an image domain based on localization information of a vehicle and object information about the object 320. The location of the candidate region 310 is represented by a central point 311 of the candidate region 310.

For example, when an error is present in the localization information of the vehicle or a parameter of a camera used to acquire the image, an error occurs in the location of the candidate region 310. Thus, the candidate region 310 has a size to correct an error that may be present.

The size of the candidate region 310 is determined based on an error in any one or any combination of the localization information of the vehicle and the parameter of the camera. As the error increases, the size of the candidate region 310 is determined to increase.

A vertical size 313 of the candidate region 310 is determined based on an error in a traveling direction of the vehicle included in the localization information of the vehicle. In an example, when the vehicle travels further than a location predicted based on the localization information due to the error in the traveling direction, a traffic light is shown at a point higher than a point at which the traffic light is predicted to be located in an image. In another example, when the vehicle does not reach the predicted location due to the error in the traveling direction, the traffic light is shown at a point lower than the point at which the traffic light is predicted to be located in the image. Thus, the vertical size 313 of the candidate region 310 needs to be determined based on the error in the traveling direction of the vehicle.

A horizontal size 315 of the candidate region 310 is determined based on an error in a lateral direction of the vehicle included in the localization information of the vehicle. In an example, when the vehicle travels on a right side of a location predicted based on the localization information due to the error in the lateral direction, a traffic light is shown at a point on a left side of a point at which the traffic light is predicted to be located in the image. In another example, when the vehicle travels on a left side of the predicted location due to the error in the lateral direction, the traffic light is shown at a point on a right side of the point at which the traffic light is predicted to be located in the image. Thus, the horizontal size 315 of the candidate region 310 needs to be determined based on the error in the lateral direction of the vehicle.

The object recognition apparatus determines that the vertical size 313 increases in response to an increase in the error in the traveling direction, and determines that the horizontal size 315 increases in response to an increase in the error in the lateral placement of the vehicle.

The error in the traveling direction and the error in the lateral direction are acquired from an error in localization information represented by x and y coordinates through a process of converting the localization information represented by the x and y coordinates to localization information represented by x' and y coordinates based on a heading angle h as described above in FIG. 2.

A parameter of a camera is a calibration parameter used to project the object 320 to an image domain, and includes, for example, a focal length of the camera, a location at which the camera is installed in the vehicle, or a capturing direction of the camera. An error in the parameter of the camera is also used to determine the size of the candidate region 310.

Figure 4:
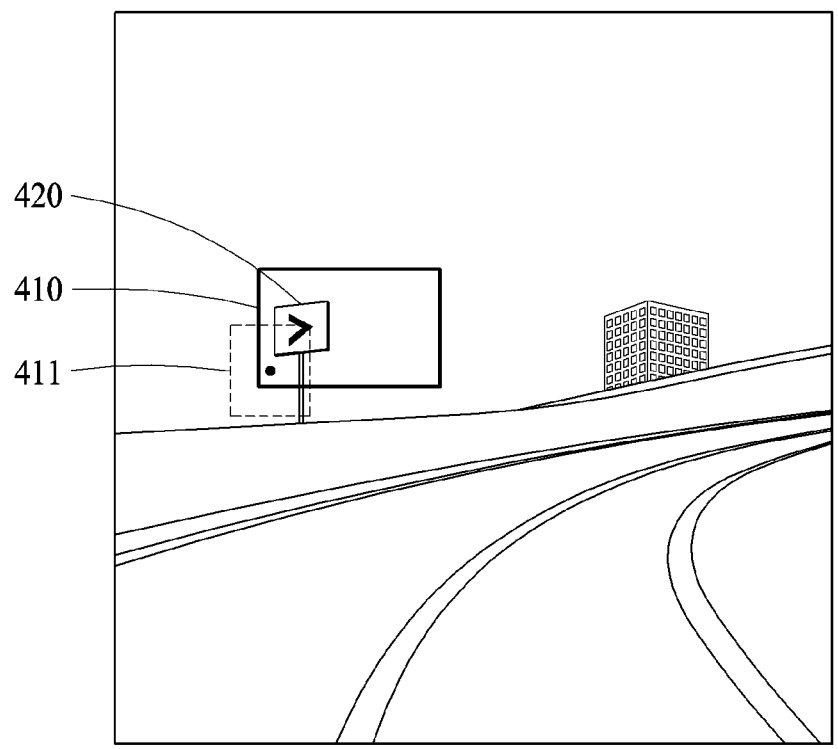
FIG. 4 is a diagram illustrating an example of recognizing an object based on a candidate region.

FIG. 4 illustrates an example of recognizing an object based on a candidate region.

FIG. 4 illustrates an example of a process of increasing a recognition rate of an object 420 based on a candidate region 410.

Hereinafter, four schemes to robustly recognize the object 420 based on the candidate region 410 are described.

A first scheme is a scheme of applying an adaptive detection threshold to the candidate region 410.

An object recognition apparatus recognizes the object 420 based on a threshold. For example, the object recognition apparatus generates, in an entire image, a plurality of candidate boxes 411 in which the object 420 may exist, and determines whether a generated candidate box 411 corresponds to an object and a type of the object through a classification process. The candidate box 411 is referred to as a "region of interest (ROI)."

In the classification process, a probability of the candidate box 411 being a specified class, such as, for example, a traffic light, a traffic sign or a signboard is determined, the probability is compared to a threshold, and an object recognition is performed. For example, when a probability of the candidate box 411 being a traffic light is determined to be "0.8" and when a threshold is determined to be "0.7," the candidate box 411 is recognized as the traffic light. In this example, when the threshold is determined to be "0.9," the candidate box 411 is not recognized as the traffic light.

By adaptively setting the threshold, the object 420 is robustly recognized. Thus, an adaptive detection threshold less than a default detection threshold is applied to the candidate region 410.

In an example, the object recognition apparatus performs a recognition of the object 420 in the image based on a default detection threshold. In this example, when the object 420 is not recognized, the object recognition apparatus recognizes the object 420 in the candidate region 410 based on an adaptive detection threshold. The above example corresponds to a scheme of recognizing the object 420 by applying the adaptive detection threshold to the candidate region 410 when the object 420 is not recognized based on the default detection threshold.

In another example, the object recognition apparatus recognizes the object 420 in regions other than the candidate region 410 in the image based on the default detection threshold, and recognizes the object 420 in the candidate region 410 based on the adaptive detection threshold. The above example corresponds to a scheme of recognizing the object 420 all at once by applying the default detection threshold and the adaptive detection threshold to different regions. In this example, when a central point of the candidate box 411 is located in the candidate region 410, the adaptive detection threshold applied to the candidate region 410 is applied to the candidate box 411. When the central point of the candidate box 411 is located outside the candidate region 410, the default detection threshold is applied to the candidate box 411.

A second scheme is a scheme of cropping the image to obtain the candidate region 410 and recognizing the object 420 in the candidate region 410. The object recognition apparatus recognizes the object 420 in the cropped image and the candidate region 410. In other words, an object recognition with respect to the candidate region 410 is performed twice, and accordingly is weighed.

A third scheme is a scheme of generating a large number of candidate boxes 411 in the candidate region 410. The candidate boxes are applied to a faster region-based convolutional neural network (R-CNN). For example, the object recognition apparatus generates a candidate box 411 having a central point located in the candidate region 410 in the image, and recognizes the object 420 using the R-CNN to which the candidate box 411 is applied. In this example, a number of generated candidate boxes is greater than or equal to a threshold number.

A fourth scheme is a scheme of performing an image enhancement on the candidate region 410 and recognizing the object 420. In an example, the image enhancement requires a considerable amount of processing time, and it may be difficult to perform an image enhancement of an entire image for a vehicle that travels at a high speed. The image enhancement is performed on the candidate region 410 instead of the entire image, and accordingly an object recognition performance is effectively enhanced with a shorter processing time. Thus, the object recognition apparatus enhances an image quality of a candidate region in an image by performing image processing on the candidate region, and recognizes the object 420 in the image including the candidate region with the enhanced image quality.

Figure 5:
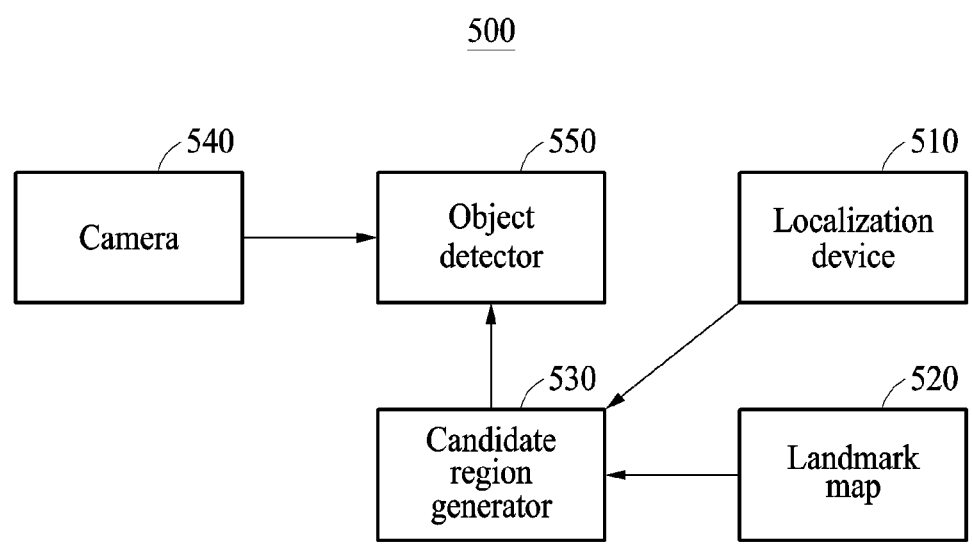
FIG. 5 is a diagram illustrating an example of an object recognition apparatus for recognizing an object.

FIG. 5 illustrates an example of an object recognition apparatus 500 for recognizing an object. In an example, the object recognition apparatus 500 is incorporated in various types of vehicles and mobile terminals. The mobile terminals described herein refers to any devices such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, other consumer electronics/information technology (CE/IT) device, or any other device capable of wireless communication or network communication consistent with that disclosed herein. However, the mobile terminal is not limited to the examples described in the forgoing.

Referring to FIG. 5, the object recognition apparatus 500 includes a localization device 510, a landmark map 520, a candidate region generator 530, a camera 540, and an object detector 550.

The localization device 510 generates localization information of a vehicle. For example, the localization device 510 generates information about a latitude, a longitude, and a heading angle of the vehicle as localization information. In an example, the localization device 510 converts the latitude and the longitude that are localization information represented by x and y coordinates to localization information represented by x' and y' coordinates based on a heading angle h. The localization device 510 transfers the localization information of the vehicle to the candidate region generator 530.

The landmark map 520 stores information about various objects fixed in locations on a road. For example, the landmark map 520 includes information about a location and type of each of objects fixed on the road. The type indicates whether a corresponding object corresponds to any one or any combination of a traffic light, a traffic sign, or a signboard, and the location indicates a latitude, a longitude and a height from the ground in association with a location at which an object is fixed. In an example, the landmark map 520 transfers object information about an object determined to be in front of a traveling vehicle to the candidate region generator 530.

The candidate region generator 530 determines a candidate region in which the object is predicted to exist in an image acquired by the camera 540, based on the localization information and the object information. For example, the candidate region generator 530 determines the candidate region to be located at a point at which the object is expected to be located in the image in response to the object being projected to an image domain based on the localization information and the object information. In an example, the candidate region generator 530 determines a size of the candidate region based on an error the localization information or a parameter of the camera 540 used to acquire the image.

The object detector 550 recognizes the object in the image based on the candidate region. In an example, when the object is not recognized in the image based on a default detection threshold, the object detector 550 recognizes the object in the candidate region based on an adaptive detection threshold that is less than the default detection threshold. In an example, the object detector 550 recognizes the object in regions other than the candidate region in the image based on the default detection threshold, and recognizes the object in the candidate region based on the adaptive detection threshold that is less than the default detection threshold.

In another example, the object detector 550 crops the image to obtain the candidate region and recognizes the object in the obtained candidate region. In another example, the object detector 550 generates a candidate box having a central point located in the candidate region in the image, and recognizes the object using an R-CNN to which the generated candidate box is applied. In this example, a number of generated candidate boxes is greater than or equal to a threshold number.

Figure 6:
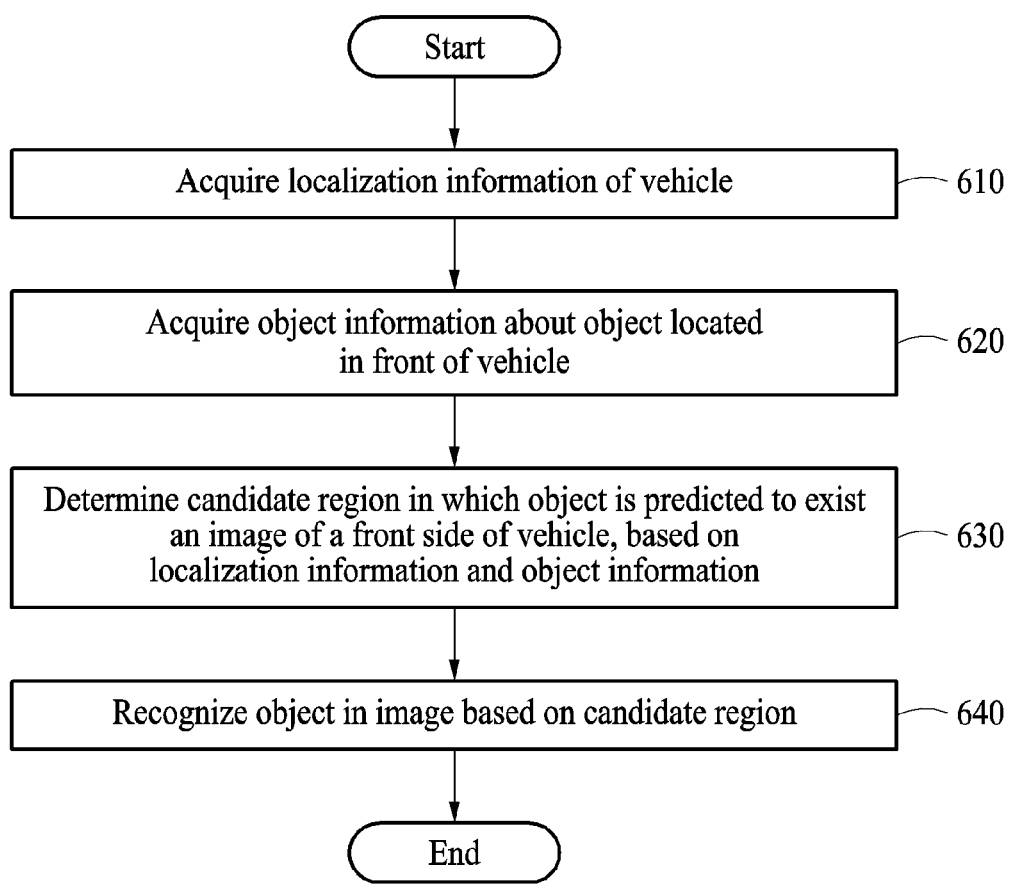
FIG. 6 is a diagram illustrating an example of an object recognition method.

FIG. 6 is a diagram illustrating an example of an object recognition method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. The object recognition method of FIG. 6 is performed by, for example, an object recognition apparatus. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, the localization information of a vehicle is acquired. In operation 620, object information about an object located in front of the vehicle is acquired. In operation 630, a candidate region is determined. The candidate region is a region in which the object is predicted to exist in an image acquired by capturing a front side of the vehicle based on the localization information and the object information. In operation 640, the object is recognized based on the candidate region.

The above description of FIGS. 1 through 5 is also applicable to the object recognition method of FIG. 6, and accordingly is not repeated here.

Figure 7:
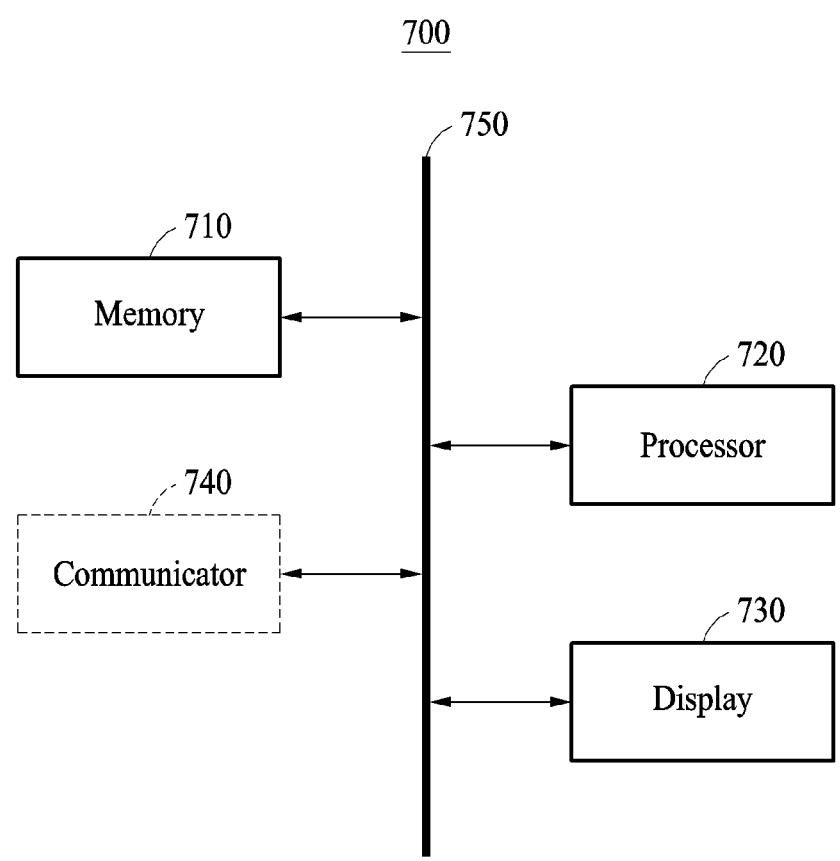
FIG. 7 is a diagram illustrating an example of an object recognition apparatus.

FIG. 7 illustrates an example of an object recognition apparatus 700.

Referring to FIG. 7, the object recognition apparatus 700 includes a memory 710, a processor 720, and a display 730. Also, the object recognition apparatus 700 further includes a communicator 740. The memory 710, the processor 720, the display 730, and the communicator 740 communicate with each other via a bus 750.

The memory 710 includes a computer-readable instruction. When the instruction stored in the memory 710 is executed by the processor 720, the processor 720 performs the above-described operations. In an example, the memory 710 includes landmark map that stores information about various objects fixed in locations on a road. The memory 710 includes, for example, a volatile memory or a nonvolatile memory, and further description of the memory 710 is provided below.

The processor 720 executes instructions or programs, or controls the object recognition apparatus 700. The object recognition apparatus 700 is connected to an external device, such as, for example, a personal computer (PC), a server, or a network via the communicator 740 and exchanges data with the external device. The object recognition apparatus 700 receives an image captured by an external terminal or receives localization information from a localization device.

The processor 720 acquires localization information of a vehicle, acquires object information about an object located in front of the vehicle, determines a candidate region in which the object is predicted to exist in an image acquired by capturing a front side of the vehicle, based on the localization information and the object information, and recognizes the object in the image based on the candidate region.

In an example, the display 730 is a physical structure that includes one or more hardware components that provide the ability to render a user interface and/or receive user input. In an example, the display 730 can be embedded in the object recognition apparatus 700. In an example, the display 730 is an external peripheral device that may be attached to and detached from the object recognition apparatus 700. The display 730 may be a single-screen or a multi-screen display.

In an example, the processor 720 projects the object in the image to a front glass or a separate screen of the vehicle using a head-up display (HUD) 730. In an example, the object recognition apparatus 700 may project the object in the image to a wind shield glass or a separate screen. However, the displaying of the object in the image is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the object recognition apparatus 700 may be used without departing from the spirit and scope of the illustrative examples described. In an example, the processor 720 outputs object in the image as audio signal through a speaker included in the vehicle.

Also, the processor 720 processes the above-described operations associated with the object recognition apparatus 700.

The object recognition apparatus 500, the object recognition apparatus 700, the localization device 510, the object detector 550, the candidate region generator 530, and other apparatuses, units, modules, devices, and other components described herein with respect to FIGS. 5 and 7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object recognition method performed by a recognition device, the object recognition method comprising:
    acquiring localization information of a vehicle, the localization information comprising a current location of the vehicle and a heading angle of the vehicle;
    acquiring object information about an object located in front of the vehicle, the object information comprising a location of the object;
    determining a size of a candidate region in which the object is predicted to exist in an image to be acquired in a direction in the front of the vehicle and a position of the candidate region in which the object is predicted to exist in the image to be acquired in the direction in the front of the vehicle, based on the current location of the vehicle, the heading angle of the vehicle, and the location of the object;
    recognizing the object in the image based on the candidate region; and
    applying a result of recognizing the object for assisting control of the vehicle or controlling the vehicle in autonomous driving of the vehicle or advanced driver-assistance of the vehicle.

2. The object recognition method of claim 1, wherein the determining of the size of the candidate region comprises determining the size of the candidate region based on an error caused by any one or any combination of the localization information and a parameter of a camera used to acquire the image.

3. The object recognition method of claim 2, wherein the determining of the size of the candidate region comprises determining that the size of the candidate region increases, in response to an increase in the error.

4. The object recognition method of claim 1, wherein the determining of the size of the candidate region comprises determining a vertical size of the candidate region based on an error in the heading angle of the vehicle included in the localization information.

5. The object recognition method of claim 1, wherein the determining of the size of the candidate region comprises determining a horizontal size of the candidate region based on an error in a lateral placement of the vehicle that is perpendicular to the heading angle of the vehicle and that is included in the localization information.

6. The object recognition method of claim 1, wherein the determining of the position of the candidate region comprises determining the candidate region to be located at a point at which the object is expected to be located in the image, in response to the object being projected to an image domain based on the localization information and the object information.

7. The object recognition method of claim 1, wherein the recognizing of the object comprises recognizing the object in the candidate region based on an adaptive detection threshold that is less than a default detection threshold, in response to the object not being recognized in the image based on the default detection threshold.

8. The object recognition method of claim 1, wherein the recognizing of the object comprises recognizing the object in regions other than the candidate region in the image based on a default detection threshold, and recognizing the object in the candidate region based on an adaptive detection threshold that is less than the default detection threshold.

9. The object recognition method of claim 1, wherein the recognizing of the object comprises cropping the image to obtain the candidate region and recognizing the object in the cropped candidate region.

10. The object recognition method of claim 1, wherein the recognizing of the object comprises generating regions of interest having a central point located in the candidate region in the image, and recognizing the object using a region-based convolutional neural network (R-CNN) to which the regions of interest are applied, wherein a number of the regions of interest is greater than or equal to a threshold.

11. The object recognition method of claim 1, wherein the recognizing of the object comprises increasing an image quality of the candidate region to be greater than a quality of the image by performing image processing on the candidate region, and recognizing the object in the image including the candidate region with the increased image quality.

12. The object recognition method of claim 1, wherein the acquiring of the object information comprises determining the object that is predicted to be located in the front of the vehicle, based on the localization information, and acquiring the location of the object and a type of the object.

13. The object recognition method of claim 1, wherein the object comprises any one or any combination of a traffic light, a traffic sign and a signboard that are fixed at a location in a road on which the vehicle travels.

14. The object recognition method of claim 1, wherein the recognizing of the object comprises recognizing the object in response to a classification probability of the object being greater than a detection threshold.

15. The object recognition method of claim 1, wherein the current location of the vehicle comprises a latitude of the vehicle and a longitude of the vehicle.

16. A non-transitory computer-readable storage medium storing instructions that, when executed by a processor, cause the processor to perform the method of claim 1.

17. An object recognition apparatus comprising:
a processor configured to:
    acquire localization information of a vehicle, the localization information comprising a current location of the vehicle and a heading angle of the vehicle;
    acquire object information about an object located in front of the vehicle, the object information comprising a location of the object;
    determine a size of a candidate region in which the object is predicted to exist in an image to be acquired in a direction in the front of the vehicle and a position of the candidate region in which the object is predicted to exist in the image to be acquired in the direction in the front of the vehicle, based on the current location of the vehicle, the heading angle of the vehicle, and the location of the object;
    recognize the object in the image based on the candidate region; and
    apply a result of recognizing the object for assisting control of the vehicle or controlling the vehicle in autonomous driving of the vehicle or advanced driver-assistance of the vehicle.

18. The object recognition apparatus of claim 17, wherein the processor is further configured to determine the size of the candidate region based on an error caused by any one or any combination of the localization information and a parameter of a camera used to acquire the image.

19. The object recognition apparatus of claim 17, wherein the processor is further configured to determine a vertical size of the candidate region based on an error in a traveling direction of the vehicle included in the localization information.

20. The object recognition apparatus of claim 17, wherein the processor is further configured to determine a horizontal size of the candidate region based on an error in a lateral placement of the vehicle that is perpendicular to the heading angle of the vehicle included in the localization information.

21. The object recognition apparatus of claim 17, wherein the processor is further configured to recognize the object in the candidate region based on an adaptive detection threshold that is less than a default detection threshold, in response to the object not being recognized in the image based on the default detection threshold.

22. The object recognition apparatus of claim 17, wherein the processor is further configured to recognize the object in regions other than the candidate region in the image based on a default detection threshold, and to recognize the object in the candidate region based on an adaptive detection threshold that is less than the default detection threshold.

23. An object recognition apparatus comprising:
a sensor configured to capture an image in a direction in front of a vehicle;
a head-up display (HUD);
a memory configured to store landmark map information; and
a processor configured to:
    acquire localization information of the vehicle, the localization information comprising a current location of the vehicle and a heading angle of the vehicle;
    determine, from landmark map information, object information about an object located in front of the vehicle, the object information comprising a location of the object;
    determine a size of a candidate region in which the object is predicted to exist in an image to be acquired in the direction in the front of the vehicle and a position of the candidate region in which the object is predicted to exist in the image in the direction in the front of the vehicle, based on the current location of the vehicle, the heading angle of the vehicle, and the location of the object; and
    recognize the object in the image based on the candidate region, in response to a classification probability of the object being greater than a threshold, and output the object through the HUD.

* * * * *